(12) United States Patent
Hammerman

(10) Patent No.: US 9,070,307 B2
(45) Date of Patent: *Jun. 30, 2015

(54) SURGICAL SIMULATION DEVICE AND ASSEMBLY

(71) Applicant: Innovative Surgical Designs, Inc., Houston, TX (US)

(72) Inventor: Steven M. Hammerman, Houston, TX (US)

(73) Assignee: Innovative Surgical Designs, Inc., Houston, TX (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/927,756

(22) Filed: Jun. 26, 2013

(65) Prior Publication Data
US 2013/0288217 A1    Oct. 31, 2013

Related U.S. Application Data

(63) Continuation of application No. 12/711,885, filed on Feb. 24, 2010, now Pat. No. 8,480,405.

(60) Provisional application No. 61/155,096, filed on Feb. 24, 2009.

(51) Int. Cl.
G09B 23/28    (2006.01)
G09B 23/30    (2006.01)

(52) U.S. Cl.
CPC .............. *G09B 23/30* (2013.01); *G09B 23/285* (2013.01)

(58) Field of Classification Search
USPC ................. 434/262, 267, 268, 270, 272–274
See application file for complete search history.

(56) References Cited

U.S. PATENT DOCUMENTS

| | | | |
|---|---|---|---|
| 4,058,910 A * | 11/1977 | Funk | 40/381 |
| 5,149,270 A * | 9/1992 | McKeown | 434/262 |
| 5,295,694 A * | 3/1994 | Levin | 273/447 |
| 5,403,191 A * | 4/1995 | Tuason | 434/262 |
| 5,425,644 A * | 6/1995 | Szinicz | 434/268 |
| 5,620,326 A * | 4/1997 | Younker | 434/268 |
| 5,873,732 A * | 2/1999 | Hasson | 434/262 |
| 5,947,744 A * | 9/1999 | Izzat | 434/272 |
| 6,488,507 B1 * | 12/2002 | Stoloff et al. | 434/272 |
| 6,517,354 B1 * | 2/2003 | Levy | 434/262 |
| 6,887,082 B2 * | 5/2005 | Shun | 434/267 |
| 7,837,473 B2 * | 11/2010 | Koh | 434/262 |
| 8,469,716 B2 * | 6/2013 | Fedotov et al. | 434/267 |
| 2007/0166682 A1 * | 7/2007 | Yarin et al. | 434/267 |
| 2009/0176196 A1 * | 7/2009 | Niblock et al. | 434/262 |

* cited by examiner

*Primary Examiner* — Kurt Fernstrom
(74) *Attorney, Agent, or Firm* — Bracewell & Giuliani LLP

(57) ABSTRACT

A system for simulating a surgical procedure, which includes a housing covering an anatomical model. The model is made up of simulated tissue supported on a base assembly that allows pivoting and rotation of the simulated tissue. The simulated tissue includes a portion that represents soft tissue, such as dermal tissue, muscle, connective tissue and the like, and a portion that represents hard tissue, such as osseous tissue. The housing includes apertures through which a surgical instrument may be inserted for simulating a procedure on the simulated tissue. Cannulas may be set within the apertures.

17 Claims, 6 Drawing Sheets

SURGICAL SIMULATION DEVICE AND ASSEMBLY

CROSS REFERENCE TO RELATED APPLICATIONS

This application is a continuation of, and claims priority to and the benefit of, co-pending U.S. patent application Ser. No. 12/711,885, filed Feb. 24, 2010, which claimed priority from U.S. Provisional Application Ser. No. 61/155,096, filed Feb. 24, 2009, the full disclosures of which are hereby incorporated by reference herein for all purposes.

BACKGROUND

1. Field of Invention

The device and method described herein concerns the field of simulating medical procedures. More specifically, a device is described that provides a modular manner of simulating different surgical procedures.

2. Description of Related Art

Some newly developed medical procedures and/or devices are sufficiently innovative that their practice requires experienced medical practitioners to undergo specific training to become proficient with the new procedure. The training for the new medical procedures, such as surgery, may incorporate devices that model anatomy. Simulating a procedure on a model rather than a patient is significantly safer and less expensive. A drawback of currently known models is they often represent a unique or single portion of anatomy. Additionally, currently known models are typically inflexible and not adjustable for multiple orientations.

SUMMARY OF INVENTION

The device and method described herein includes a surgical simulation device. In an embodiment, a surgical simulation device includes simulated tissue, an aperture support offset a distance from the simulated tissue that comprises a curved dome that covers the simulated tissue, and an aperture formed through the aperture support and facing the simulated tissue so that when a surgical procedure is simulated on the simulated tissue, a surgical instrument is inserted through the aperture to simulate inserting the surgical instrument through an incision in tissue.

In an embodiment, disclosed is an anatomical model for use in simulating a surgical procedure that has a base having an upper surface, a curved dome having an inner surface facing the upper surface of the base and which defines a space, simulated tissue coupled to the base that is set a distance from the upper surface in the space and set back a distance from the dome, and an aperture strategically disposed in a sidewall of the dome, so that when a surgical procedure is simulated on the simulated tissue, a surgical instrument is inserted through the aperture to simulate inserting the surgical instrument through an incision

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 1:
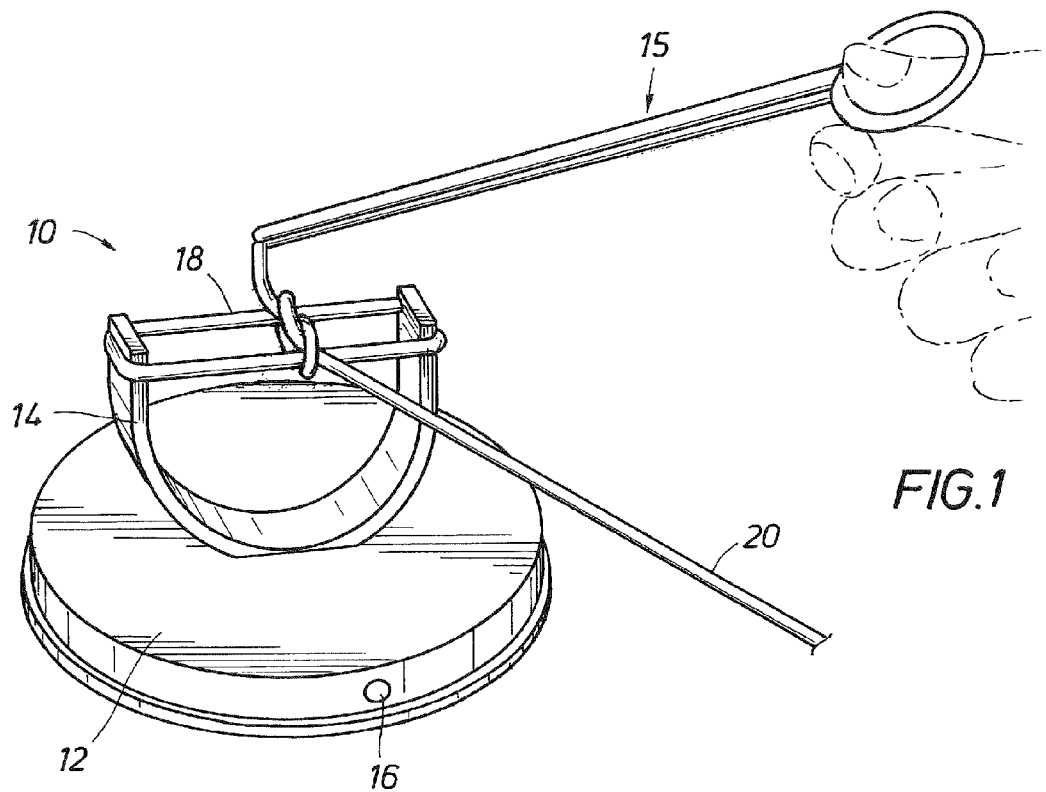
FIG. 1 is a side perspective view of training for a surgical procedure using a simulation device.

With reference now to FIG. 1, an example of a surgical simulation device 10 is shown in a perspective view. In this embodiment the surgical simulation device 10 includes a base 12 with a cylindrically shaped disc 13 mounted from below. The upper surface of the disc 13 registers with an aperture formed axially through the base 12. The upper surface of the base 12 features a central circumferential taper toward the aperture. A lateral side is formed at the outer periphery of the base 12 where it projects substantially perpendicular to the axis of the base 12. A bore 16 is shown extending laterally into the lateral side of the base 12. The disc 13 is coaxially rotatable within the base 12 and provides a mounting surface for a yoke 14. The yoke 14 shown is a "U" shaped member having a mid-portion mounted on the upper surface of the spindle 13. The yoke 14 curves between the mid-portion and its opposing ends so that the opposing ends project away from the base 12. An elastic member 18 is shown looping around both ends of the yoke 14 and suspended above and perpendicular to the base 12. In other embodiments, the member 18 may be fully rigid or inelastic. The elastic member 18, which in one example represents connective tissue, can be readily placed on or off the yoke 14 for simulating a surgical procedure. An example simulated surgical procedure is shown where a surgical instrument 15 is being manually manipulated to knot a demonstration cord 20 around the elastic member 18 for drawing together both sides of the elastic member 18. The surgical instrument 15 and cord 20 are depicted for demonstration purposes, however actual surgical instruments and suture materials may also be included with the embodiment of FIG. 1.

Figures 2A, 2B:
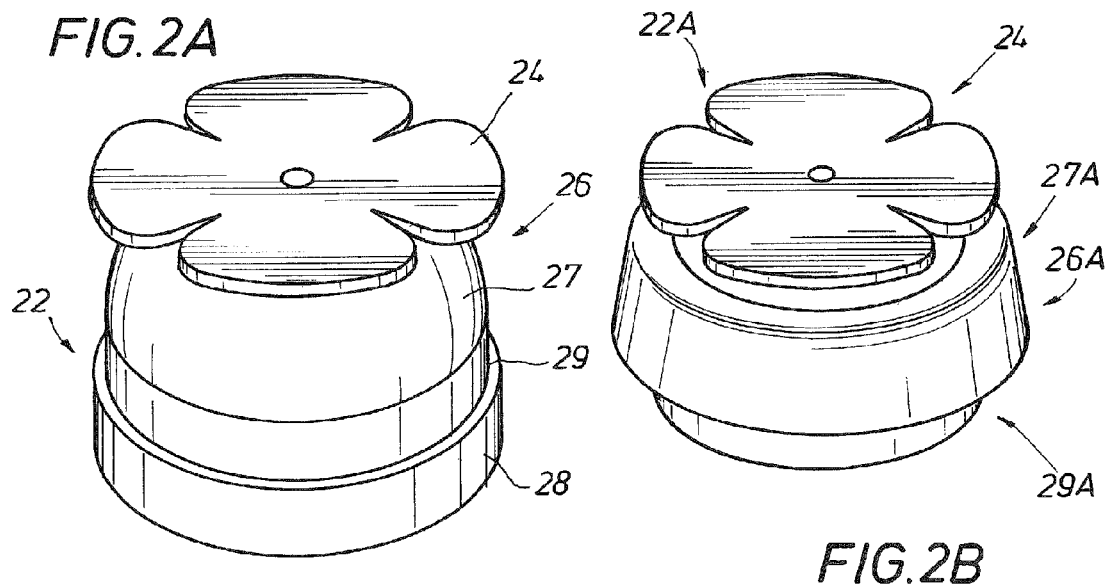
FIG. 2A is a perspective view of a simulation assembly with simulated tissue and a substrate.
FIG. 2B is a perspective view of an alternative embodiment of a simulation assembly with simulated tissue and a substrate.

An example of a simulation assembly 22 is shown in perspective view in FIG. 2A and having a shaped piece of simulated tissue 24 mounted on a substrate 26. As shown, the simulated tissue 24 is generally planar and profiled at its corner portions so that it resembles a clover leaf. In this example the simulated tissue 24 can represent a rotator cuff. Example materials for the simulated tissue 24 include elastomers such as rubber and foam, as well as felt, cloth, combinations thereof, and the like. The substrate 26 includes a hemispherical upper portion 27 shown set on a cylindrical lower portion 29; the simulated tissue 24 is mounted on the upper portion. A band of simulated tissue 28 circumscribes the outer periphery of the cylindrical lower portion 29. The substrate 26 can be used for simulating bone. The substrate 26 material can be rigid but allow for suturing (example materials include foam, such as a polyurethane foam) but may be made of other materials as well such as a polystyrene or polystyrene like material.

An alternative example of a simulation assembly 22A is illustrated in a side perspective view in FIG. 2B. In this example the simulation assembly 22A includes a substrate 26A having a frusto-conical upper portion 27A and a cylindrically shaped lower portion 29A depending from the lower surface of the upper portion 27A. The upper portion 27A has a planar upper surface on which simulated tissue 24 is attached. The upper portion 27A has lateral sides that taper radially outward from between the upper surface to the lower surface of the upper portion 27A.

Figure 3:
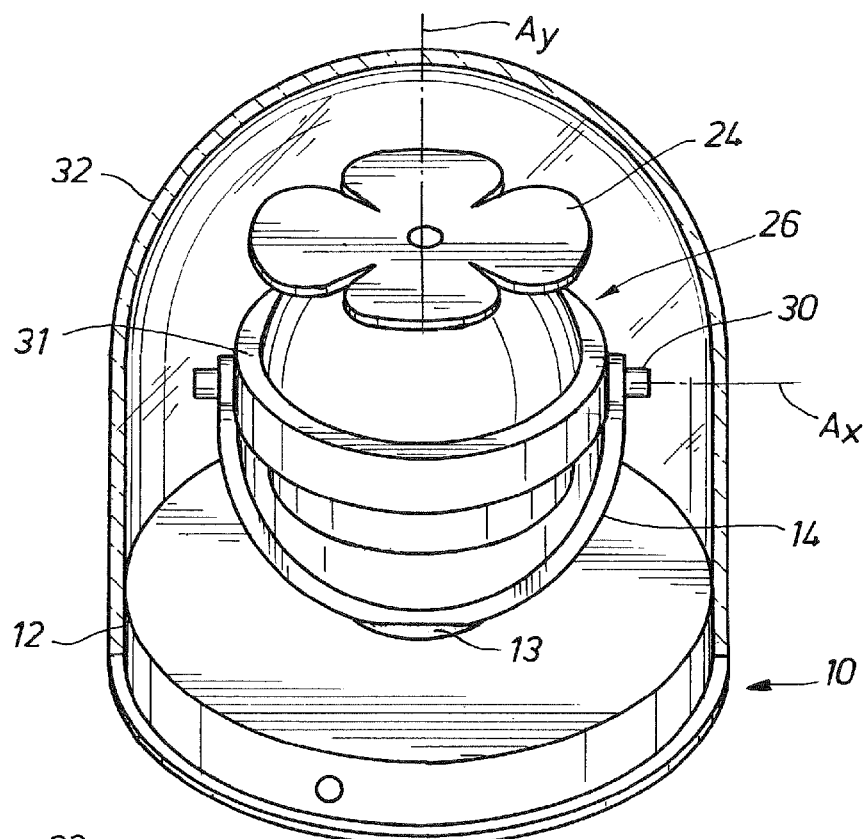
FIG. 3 is a perspective view of a simulation device and simulation assembly in a housing.

FIG. 3 provides in side perspective view an examples of the simulation assembly 22 mounted onto the yoke 14 of the simulation device 10. A ring 31 is shown circumscribing the substrate 26, bores (not shown) in the yoke 14 register with bores through the side wall of the ring 31. Fasteners 30 are shown provided that extend through the registered bores in the yoke 14 and ring 31 and into the substrate 26. The fasteners 30 can be threaded with matching threads in the bore in the ring 31, or can be pin like members that pass through the bores in the ring 31. Optionally, the fasteners 30, when applied, can compress the ring 31 to bind the assembly 22 therein instead of piercing the substrate 26.

In the configuration of FIG. 3, the assembly 22 may pivot about an axis $A_X$ aligned with the fasteners 31; the assembly 22 may also rotate about an axis $A_Y$ of the base 12 and the disc 13. In an example, the disc 13 is coaxial with the axis $A_Y$ and thus rotates within the base 12 about the axis $A_Y$. Provided with this embodiment is a housing 32 shown secured to the base 12 and enclosing the simulation assembly 22. In the example illustrated, the housing 32 lower end is open and encircles the outer periphery of the base 12, the housing 32 extends upward from the base 12 substantially parallel with the axis $A_Y$ and curves inward to form a dome like upper portion over the simulated tissue 24. Alternatively, the housing 32 can have an upper end with other shapes, such as conical, cylindrical, or asymmetric and can have an outer surface that is uneven or includes undulations. In yet another alternative, the housing 32 can be clear, translucent, or opaque and/or may include strips that have at least a portion supported in a space around the simulation assembly 22.

Figure 4:
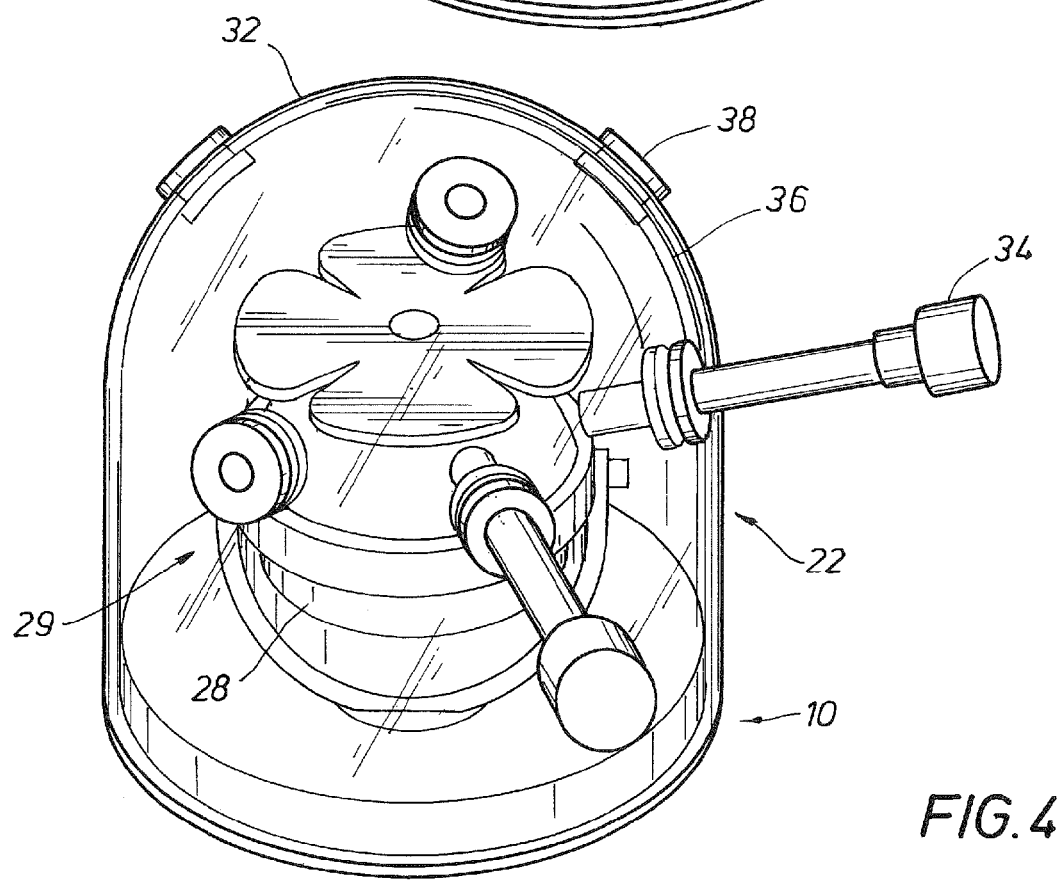
FIG. 4 is a side perspective view of a simulation device and simulation assembly in a housing and cannulas protruding through the housing.

Referring now to FIG. 4, the housing 32 is equipped with apertures 36 and cannulas 34 are shown inserted through the apertures 36. Thus in FIG. 4, the housing 32 serves as a support for the aperture 36. Alternatively, an aperture support can be any member for supporting an aperture 36 in space and offset from the simulation assembly 22. Examples include a planar web element having an end supported on a surface proximate the simulation assembly 32 that extends to a location offset from the simulation assembly 32. Grommets 38 as shown may optionally be set within the apertures 36. The cannulas 34, which are obtainable from most medical supply sources, provide conduits for insertion of surgical instruments (not shown) through the housing 32 and into the simulation assembly 22. Thus a surgical procedure can be simulated by directing cannulas 34 at the simulation assembly 22 and inserting surgical instruments through the cannulas 34 to simulate a procedure on the simulation assembly 22. In an example, the housing 32 represents patient or subject tissue through which surgical instruments are inserted and the apertures 36 can each represent an incision.

Figure 5A:
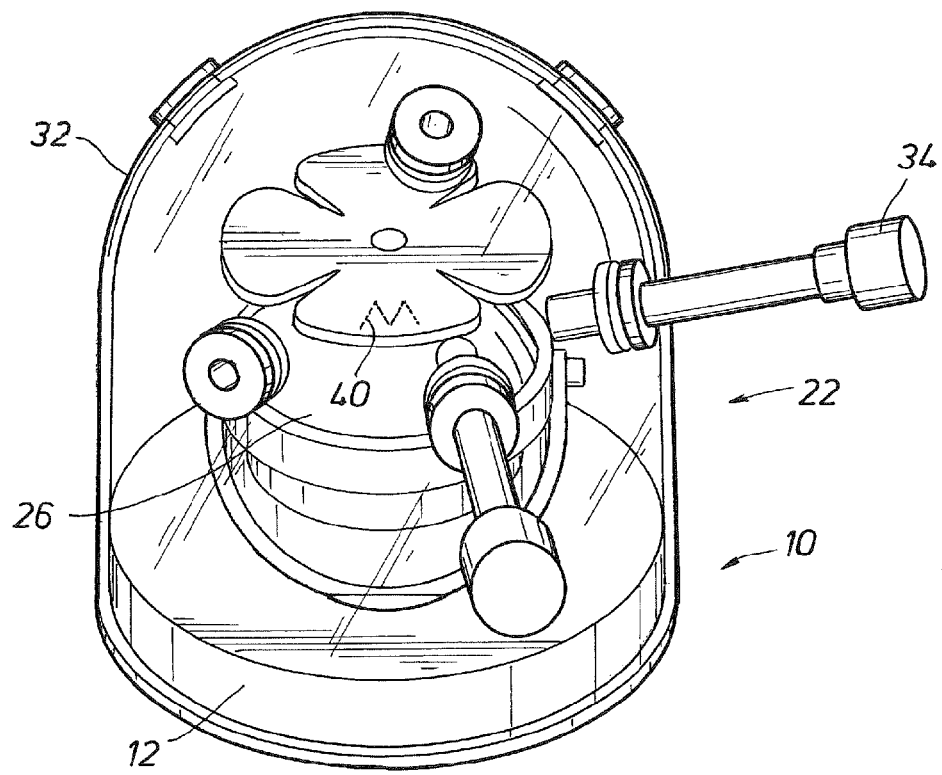
FIGS. 5A and 5B are side perspective views of the device of FIG. 4 having sutures in the simulated tissue and simulated substrate.
Figure 5B:
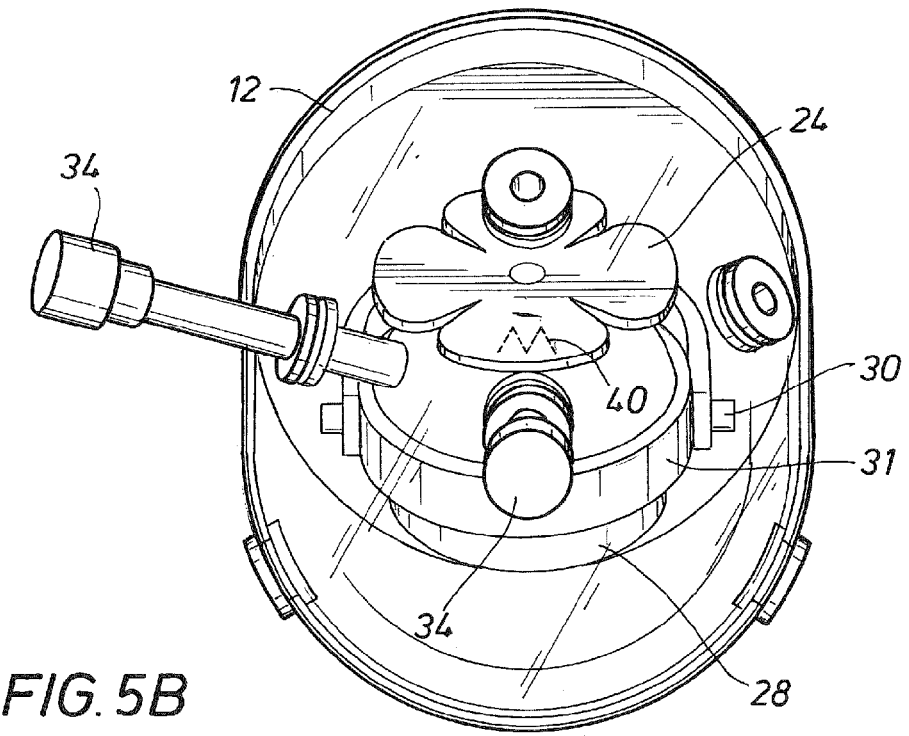

FIGS. 5A and 5B, which are similar to the illustration in FIG. 4, further include sutures 40 shown formed through the simulated tissue 24 and the substrate 26. The sutures 40 were formed with a surgical device inserted through a cannula 34 mounted in the housing 32. Referring now to FIG. 5B, the simulation assembly 22 is shown pivoted about the axis $A_X$ and oriented transverse from its orientation of FIG. 5B. Accordingly, the pivoting ability of the simulation assembly 22 on the yoke 14 provides flexibility for different simulation orientations. FIGS. 5A and 5B depict simulated examples of a completed arthroscopic rotator cuff repair. In an example, the simulated tissue 24, 28 represents mammal soft tissue, such as epidermis, connective tissue, muscle, tendons, ligaments, combinations thereof, and the like. Optionally, the substrate 26 represents hard tissue, such as an osseous or osseous like material.

Figure 6A:
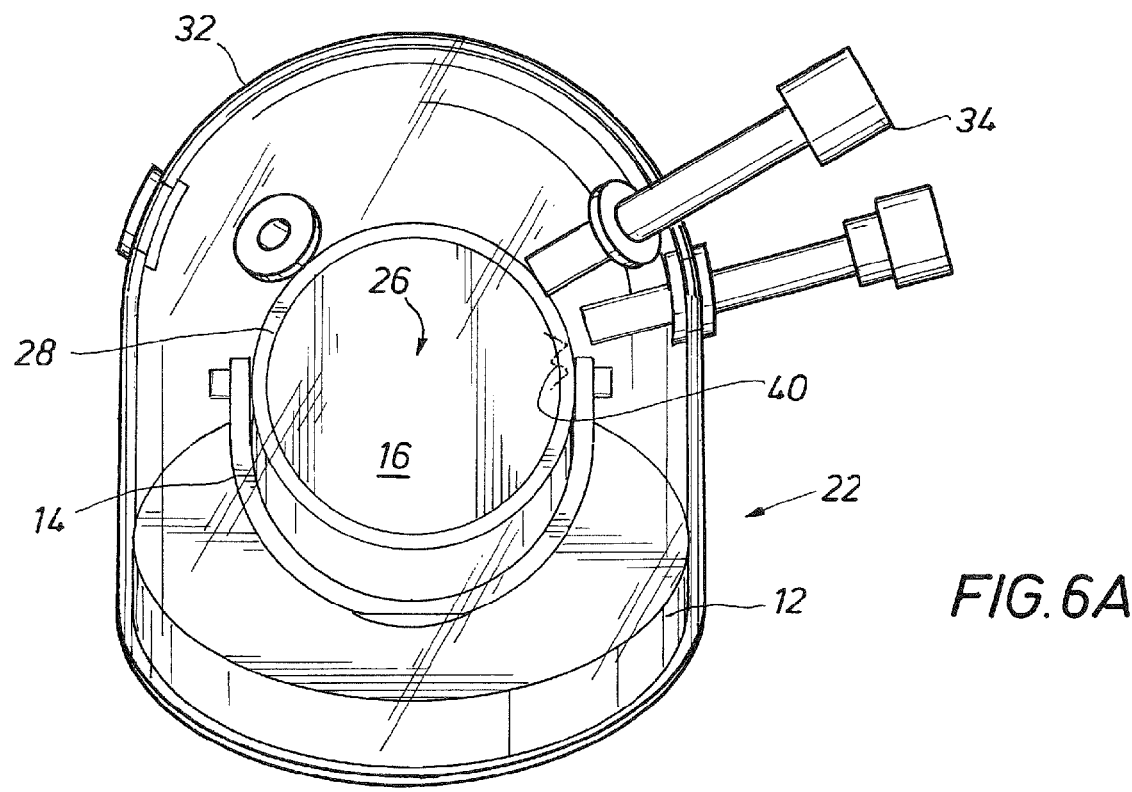
FIGS. 6A and 6B are side perspective views of a simulation assembly in horizontal and vertical orientations in a housing with simulated tissue sutured to simulated substrate.
Figure 6B:
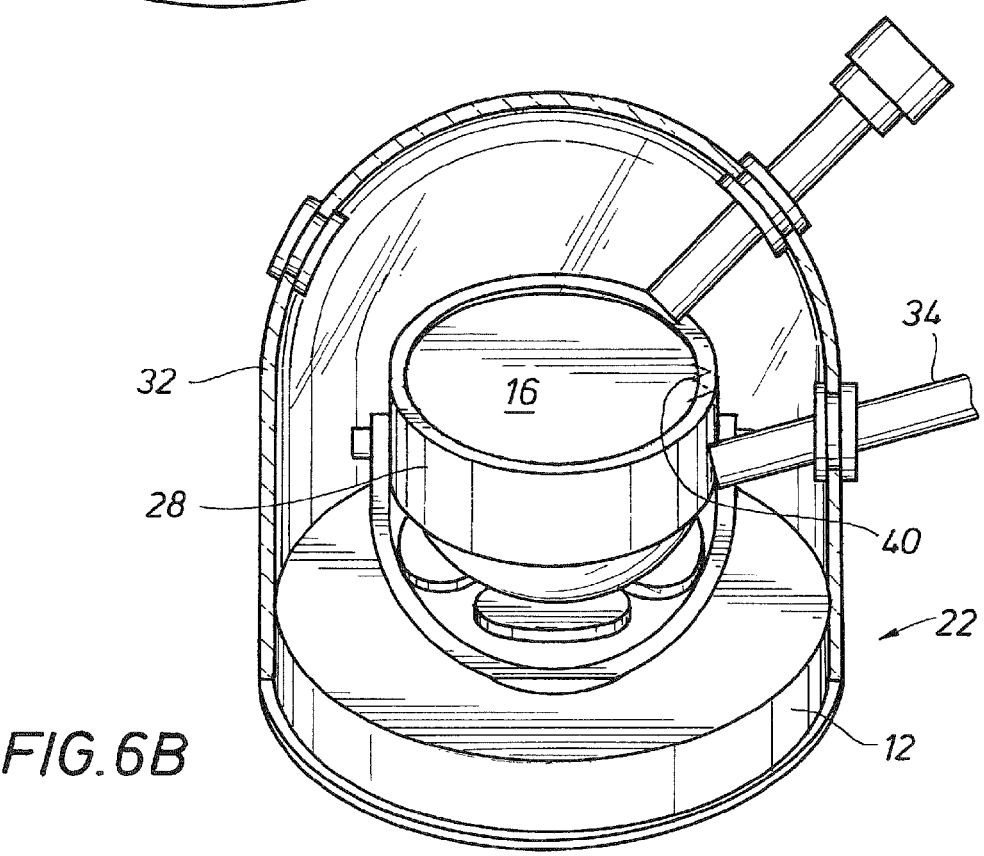

Further orientation flexibility is demonstrated in FIGS. 6A and 6B where the simulation assembly 22 is shown with its lower side disposed in a plane substantially parallel with axis $A_Y$ (FIG. 6A) and its lower side facing the housing (FIG. 6B). In both views sutures 40 are provided through the simulated tissue 28 and the substrate 26 lower surface. FIGS. 6A and 6B portray examples of a completed glenoid labrum repair. Thus the simulation assembly 22 can be fully rotated about both $A_X$ and $A_Y$ axes to position the assembly 22 into any desired orientation thereby providing for a simulated surgical procedure from multiple directions.

Figure 7A:
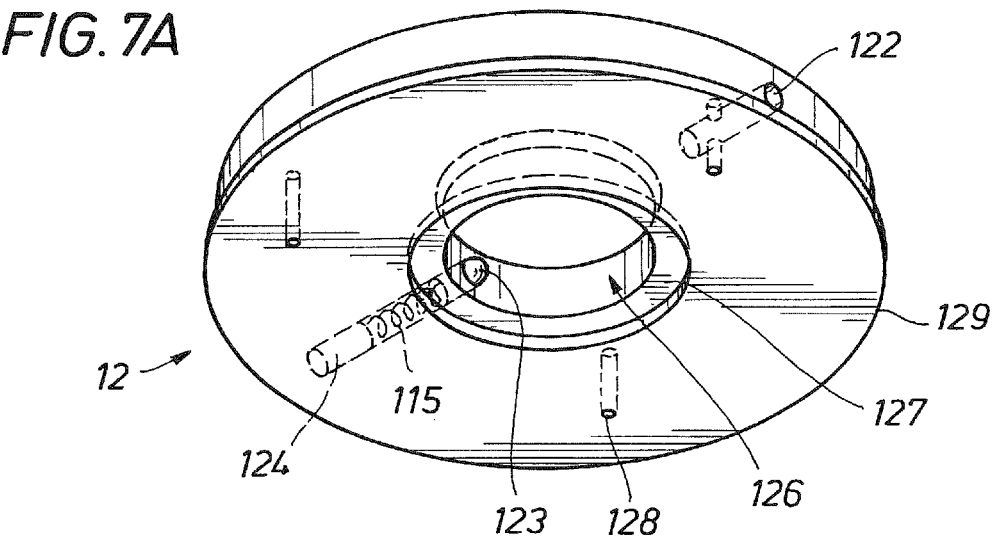
FIGS. 7A and 7B are upper and lower side perspective views of a base.
Figure 7B:
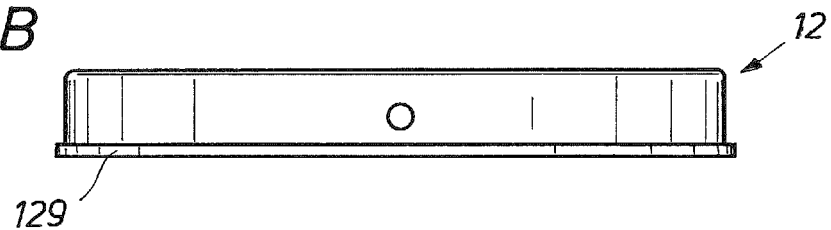

FIG. 7A illustrates a perspective and view of an example of the base 12. The base 12 as shown is a disc-like member with its radius greater than its length or thickness and includes an annulus 126 aligned with its axis. Side bores 122, 124 are shown laterally extending through the base 12; side bore 124 extends from the base 12 outer periphery to the annulus 126. Vertical bores 128 are shown formed upward into the base 12 from its bottom surface. A lip 129 can optionally be included on the base 12 periphery at its lower end. The annulus 126 is shown circumscribed by a recess 127 at its lower entrance. The side bore 124 may be fitted with a resilient member 125, such as a spring, and a detent element 123, wherein the member 125 urges the detent element 123 from the side bore 124 into the annulus 126. FIG. 7B illustrates a side sectional view of the disc 12. Here the lip 129 is shown extending radially outward past the outer radius of the annulus 126.

Figure 8:
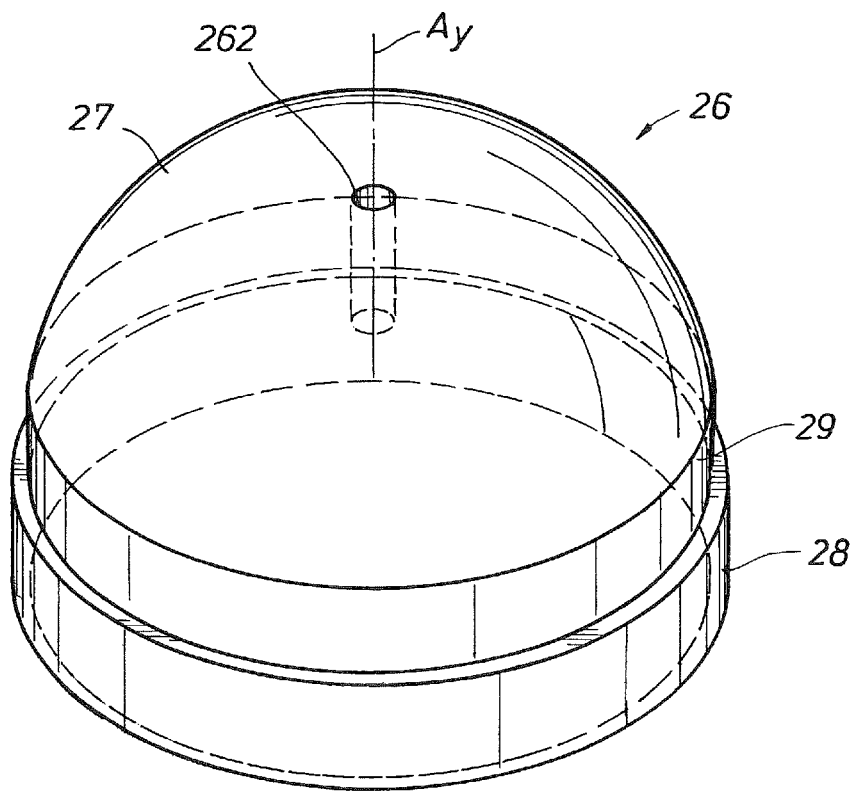
FIG. 8 is a perspective view of an example substrate with a circumscribing ring.

FIG. 8 illustrates in a perspective side view an example of a substrate 26 with an accompanying ring 31. The substrate 26 is shown having an upper bore 262 shown formed into the upper portion 27 of the substrate 26 and substantially aligned with the axis $A_Y$. The upper bore 262 can be threaded to couple with an attachment for the simulated tissue 24 (see FIG. 3). Side bores 310 are shown formed through the side wall of the ring 31 for coupling the ring 31 to the lower portion 29 of the substrate 26. The bores 310 can be smooth or threaded and dimensioned to receive fasteners 30 therein.

Figure 9:
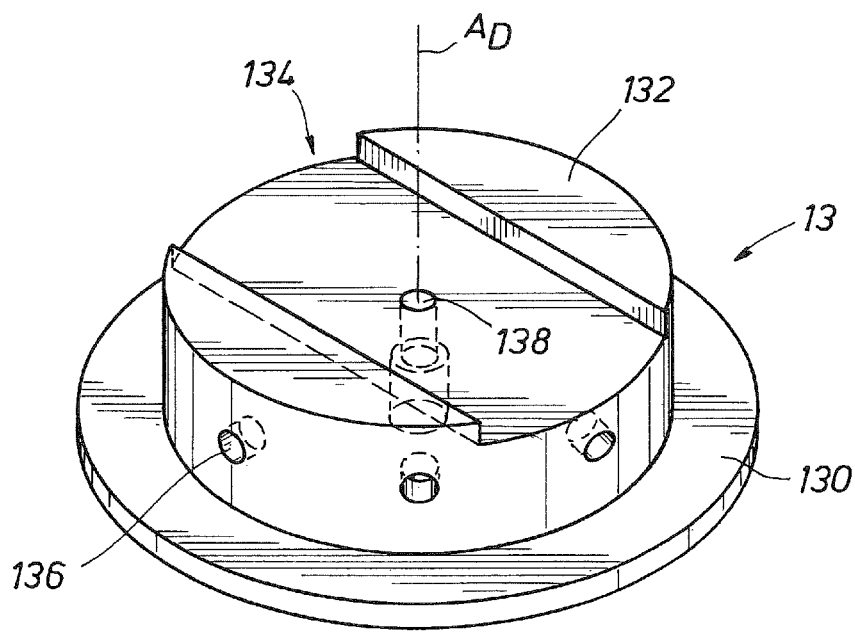
FIG. 9 is a side perspective view of an example of a disc.

A side perspective view of an example of the disc 13 is provided in FIG. 9. As shown, the disc 13 includes a cylindrically shaped spindle 132 set substantially coaxial with an axis $A_D$ of the disc 13. A disc like flange 130 projects radially outward from the lower end of the spindle 132. A slot 134 is provided on the upper surface of the spindle 132 and transverse to the axis $A_D$ of the disc 13. The slot 134, as shown, is formed to receive the mid-portion of the yoke 14. A bore 138 shown formed coaxial with the axis $A_D$ extends through the spindle 132 from the bottom of the slot 134. A threaded fastener, not shown, can be inserted into the bore 138 to secure the yoke 14 within the slot 134. Bores 136 are illustrated formed in the outer periphery of the spindle 132 and oriented generally towards the axis $A_D$. The spindle 132 is insertable into the annulus 126 of the base 12 and can axially rotate therein. Rotating the disc 13 with respect to the base 12 selectively registers the bores 136 with the side bore 124; the pushing force supplied by the resilient member 125 urges the detent element 123 (see FIG. 7A) to enter an aligned bore 136 when registered with the side bore 124. Applying a rotational torque onto the base 12 can disengage the detent element 123 from the registered bore 136 enabling the disc 13 to rotate within the base 12 and into a different angular orientation. The disengaging force required to disengage from locking detent element 123 can prevent the base 12 from freely rotating about its axis $A_X$. The amount of force necessary to compress the resilient member 125 will dictate the disengaging rotational force.

Figure 10:
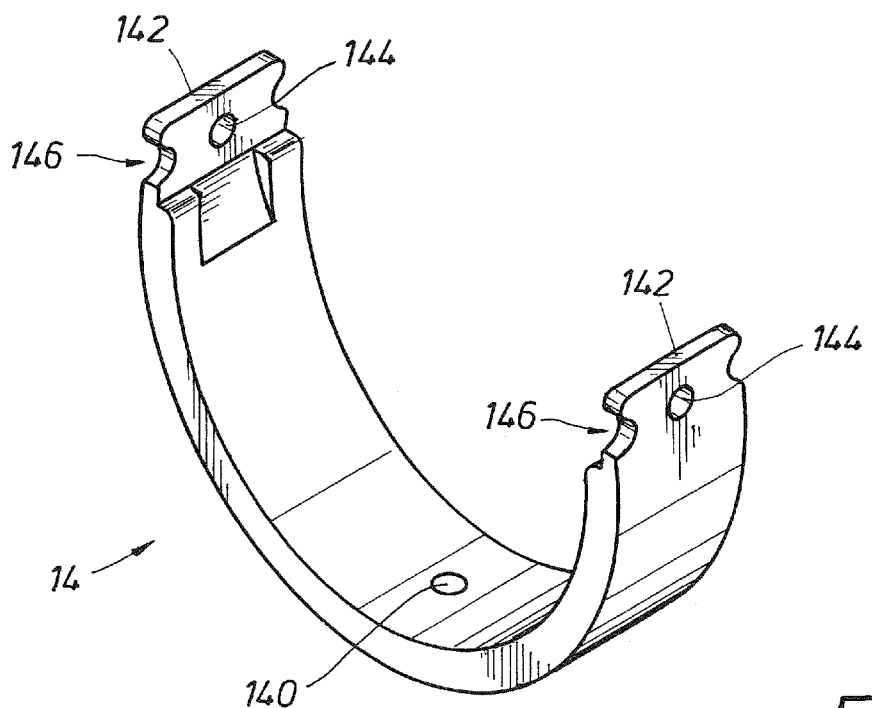
FIG. 10 is a perspective view of an embodiment of a yoke.

FIG. 10 illustrates an example of the yoke 14 in a side perspective view. As shown, the yoke 14 is a generally curved member having a bore 140 formed through at roughly its midsection 148. The bore 140 is shown as threaded to receive a fastener (not shown), which may be threaded, for attachment to the disc 13. The yoke 14 curves with distance from its midsection 148 with its ends 142 a distance apart and away from the midsection 148. The yoke 14 as shown is an elongated member having a generally rectangular cross section. Curved recesses 146, that may receive the elastic member 18, are shown provided on the lateral sides of each of the ends 142. Also shown formed on the ends are bores 144 oriented towards one another and normal to the bore 140. The bores 144 may be registered with bores 310 so fasteners 30 can be inserted through the registered bores 144, 310.

In an embodiment, a simulation assembly 22 combined with a simulation device 10 can be used as a trainer for shoulder arthroscopy. The use of arthroscope and/or surgical cannulas is optional. The embodiments of the simulation device 10, and all portions thereof, described herein can be used to perform surgical procedures such as knot tying, suturing techniques, suture anchor insertion, suture management, rotator cuff repair, anterior glenoid labrum (Bankart) repair, posterior gleneoid labrum repair, SLAP repair, and combinations thereof. The simulated tissue may be flexible and include in its composition single as well as dual density EPF foam and other bone simulation materials. Red sponge rubber, neoprene, and Veltex® can be used as simulation tissue. Colors of the simulation tissue, or other components of the simulation device 10, can be changed to match particular or desired color schemes. The surgical simulations can be semi-anatomic or schematic, can simulate left or right body anatomy, can be oriented to represent "beach chair" or lateral decubitus position without repositioning the base.

It is to be understood that the invention is not limited to the exact details of construction, operation, exact materials, or embodiments shown and described, as modifications and equivalents will be apparent to one skilled in the art. It is not necessary that the supports have an annular opening, optionally the supports may comprise a shoulder or be semi-circular. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

The invention claimed is:

1. A surgical simulation device comprising:
   a planar base having a curved outer circumference;
   a disc mounted in the base and that rotates with respect to the base;
   simulated tissue coupled to a support that is attached to the disc;
   an aperture support offset a distance from the simulated tissue that comprises a curved dome having an opening that faces the base, and a solid closed portion that covers the simulated tissue; and
   an aperture formed through the aperture support and facing the simulated tissue so that when a surgical procedure is simulated on the simulated tissue, a surgical instrument is inserted through the aperture to simulate inserting the surgical instrument through an incision in tissue.

2. The device of claim 1, wherein the simulated tissue comprises a hemispherical upper portion.

3. The device of claim 2, wherein the simulated tissue comprises an osseous portion and the soft tissue portion that has a middle section that mounts on an upper surface of the osseous portion and that has clover leaf like portion that project from the middle section so that the soft tissue portion resembles a rotator cuff.

4. The device of claim 1, further comprising a fastener that projects through the ring and into the simulated tissue to couple together the simulated tissue and the ring.

5. The device of claim 1, wherein the simulated tissue comprises simulated soft tissue and simulated hard tissue, wherein the simulated soft tissue represents a substance comprising tissue selected from the list consisting of dermal tissue, connective tissue, muscle, ligaments, and tendons, and wherein the simulated hard tissue represents a substance comprising osseous tissue.

6. The device of claim 1, wherein a surgical instrument is inserted within the aperture and is in contact with the simulated tissue.

7. The device of claim 1, further comprising a multiplicity of apertures that are strategically located and simulate incisions through which a surgical instrument is inserted.

8. The device of claim 1, wherein a portion of the dome is made of a material having a visual characteristic selected from the group consisting of transparent, translucent, opaque, and combinations thereof.

9. The device of claim 1, having a grommet inserted into the aperture.

10. The device of claim 1, further comprising a ring supported at a distance above the disc, and which is selectively disposed at an angle oblique to an upper surface of the disc.

11. The device of claim 1, wherein the simulated tissue is mounted in the ring and has a curved outer periphery.

12. An anatomical model for use in simulating a surgical procedure comprising:
   a base having an upper surface;
   a curved dome having an inner surface facing the upper surface of the base and which defines a space;
   a ring in the space that is supported on the base;
   simulated tissue coupled to the ring, and that has a hemispherical shape; and an aperture strategically disposed in a sidewall of the dome, so that when a surgical procedure is simulated on the simulated tissue, a surgical instrument is inserted through the aperture to simulate inserting the surgical instrument through an incision.

13. The model of claim 12, wherein the simulated tissue resembles a rotator cuff.

14. The model of claim 12, wherein the simulated tissue resembles a glenoid labrum.

15. The model of claim 12, wherein the simulated tissue resembles tissue found in a human shoulder.

16. The model of claim 12, further comprising a disc coaxially mounted in the base and a support member mounted to the disc and having a free end attached to the ring.

17. The model of claim 12, wherein the ring is selectively rotatable about an axis that intersects the ring.

* * * * *